(12) United States Patent
Van Landeghem

(10) Patent No.: US 12,134,578 B2
(45) Date of Patent: Nov. 5, 2024

(54) METHOD AND SYSTEM FOR GENERATING A CUTTING PLAN OF A COMPLEX GLAZING PRODUCT

(71) Applicant: SAINT-GOBAIN GLASS FRANCE, Courbevoie (FR)

(72) Inventor: Maxime Van Landeghem, Fontenay sous Bois (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 384 days.

(21) Appl. No.: 17/628,795

(22) PCT Filed: Jul. 8, 2020

(86) PCT No.: PCT/EP2020/069263
§ 371 (c)(1),
(2) Date: Jan. 20, 2022

(87) PCT Pub. No.: WO2021/018534
PCT Pub. Date: Feb. 4, 2021

(65) Prior Publication Data
US 2022/0267190 A1    Aug. 25, 2022

(30) Foreign Application Priority Data
Jul. 26, 2019    (FR) ...................................... 1908551

(51) Int. Cl.
*C03B 33/037*    (2006.01)
*C03B 33/07*    (2006.01)

(52) U.S. Cl.
CPC .......... *C03B 33/037* (2013.01); *C03B 33/078* (2013.01)

(58) Field of Classification Search
CPC .... C03B 33/037; C03B 33/078; C03B 33/076
(Continued)

(56) References Cited

U.S. PATENT DOCUMENTS

| | | | | |
|---|---|---|---|---|
| 2004/0134231 A1* | 7/2004 | Oya | ................. | G02F 1/133351 65/29.11 |
| 2014/0094948 A1* | 4/2014 | Peyrude | ................. | G06F 30/00 700/106 |

(Continued)

FOREIGN PATENT DOCUMENTS

| WO | WO 2007/057463 A1 | 5/2007 |
|---|---|---|
| WO | WO 2014/083371 A1 | 6/2014 |

OTHER PUBLICATIONS

International Search Report as issued in International Patent Application No. PCT/EP2020/069263, dated Sep. 7, 2020.

*Primary Examiner* — Omar Flores Sanchez
(74) *Attorney, Agent, or Firm* — Pillsbury Winthrop Shaw Pittman LLP

(57) ABSTRACT

A method for generating a cutting plan of a complex glazing product including a glass sheet and a layer other than a glass sheet, the method including obtaining a map of the defects of the glass sheet; obtaining at least one other defect map, the defects of the other map not being defects of a glass sheet; each of the maps including, for each of its defects, a position of the defect, a size of the defect, and a criticality level of the defect; generating a cutting plan of the complex glazing product using the maps and a specification taking into account the criticality levels, the cutting plan including a cutting line and being such that none of the cutting lines passes through an exclusion zone of the defect of the glass sheet, wherein a cutting line passes through an exclusion zone of a defect of the other map.

16 Claims, 3 Drawing Sheets

(58) Field of Classification Search
USPC .............................................................. 83/13
See application file for complete search history.

(56) References Cited

U.S. PATENT DOCUMENTS

| | | | |
|---|---|---|---|
| 2015/0375415 A1* | 12/2015 | Sausset | B26D 1/085 |
| | | | 83/34 |
| 2016/0026948 A1* | 1/2016 | Ohigashi | C03B 33/037 |
| | | | 705/7.36 |
| 2019/0382300 A1* | 12/2019 | Bui | B23K 26/032 |
| 2021/0053861 A1* | 2/2021 | Van Landeghem | ........................ |
| | | | G05B 19/4097 |
| 2024/0150216 A1* | 5/2024 | Rapenne | C03B 33/04 |

* cited by examiner

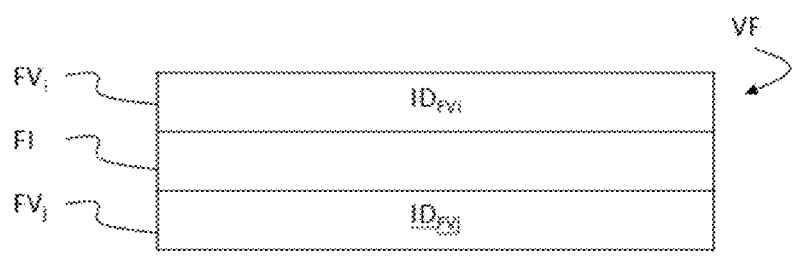

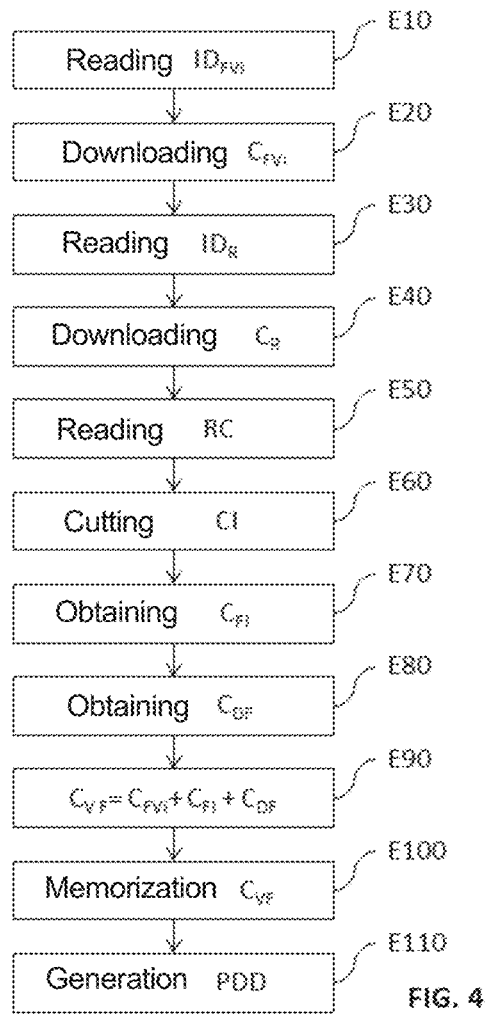
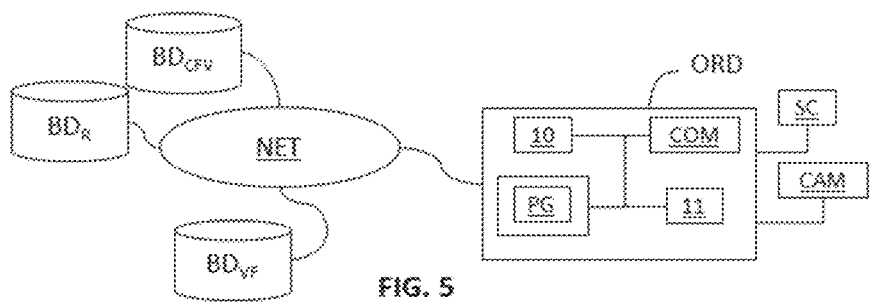

METHOD AND SYSTEM FOR GENERATING A CUTTING PLAN OF A COMPLEX GLAZING PRODUCT

CROSS-REFERENCE TO RELATED APPLICATIONS

This application is the U.S. National Stage of PCT/EP2020/069263, filed Jul. 8, 2020, which in turn claims priority to French patent application number 1908551 filed Jul. 26, 2019. The content of these applications are incorporated herein by reference in their entireties.

BACKGROUND OF THE INVENTION

The invention relates to the technological field of the cutting of glazing products. In this document, any product comprising at least one glass sheet is called a "glazing product".

The invention more particularly relates to a method for generating a cutting plan of a glazing product taking into account potential defects present in glass sheets.

Document WO 2014/083371 of the Applicant describes such a method. In summary and generally, this method describes a method for generating a cutting plan of a glass sheet in which:
- the presence of defects in a glass ribbon is detected before it is cut into sheets;
- each glass sheet is identified by a unique identifier, for example taking the form of a barcode;
- a severity criterion of each of the defects is determined;
- an attribute map is generated for each glass sheet, the attributes of a glass sheet comprising the position of the defects and the severity criteria;
- the attribute maps of the various glass sheets are stored in a database;
- a user is allowed to find all or some of the attribute map of a given glass sheet;
- an optimized cutting plan of this glass sheet is generated using at least some of the attribute map of this sheet.

This method is very advantageous, but it does not allow the cutting plan of a complex glazing product, for example a laminated glass, to be optimized.

In particular, in current methods for cutting a complex glazing product, the defects taken into account to generate the cutting plan are taken into account after assembly of the glazing product and no distinction is made between defect arising from the glass sheets and those arising from the other constituent elements of the complex glazing product. Thus, all the defects are treated in the same way, like those of the glass sheets: no cutting line can pass through these defects, nor indeed through their exclusion zone. Needless losses thus result therefrom during cutting.

It will be recalled that an exclusion zone of a defect in a glass sheet is a zone around the defect such that if a cutting line were to pass through said zone, the cut would be erratic or cause breakage of the piece of glass in question.

By treating all the defects in the same way, prior-art cutting methods implicitly define exclusion zones around the defect of the other constituent elements of the complex glazing product, and in particular around the defects of the interlayer sheets in the case of laminated glass.

For example, even assuming that the map of the defects of each glass sheet and the map of the defects of an interlayer sheet made of polyvinyl butyral (PVB) for the manufacture of a laminated glass are possessed, the Applicant has observed that a method for generating a cutting plan that has as input a map of the defects of the laminated glass that is obtained by simple superposition of these maps generates many needless losses.

The present invention pertains to a method for generating an improved culling plan of a complex glazing product.

OBJECT AND SUMMARY OF THE INVENTION

More precisely, the invention relates to a method for generating a cutting plan of a complex glazing product comprising at least one glass sheet and at least one layer other than a glass sheet, this method comprising:
- a step of obtaining a map of the defects of said at least one glass sheet;
- a step of obtaining at least one other defect map, the defects of said at least one other map not being defects of a glass sheet;
- each of the maps comprising, for each of its defects, a position of the defect, a size of said defect, and a criticality level of said defect;
- a step of generating a cutting plan of the complex glazing product at least using these maps and using a specification taking into account said criticality levels of the defects, the cutting plan comprising at least one cutting line and being such that none of the cutting lines passes through an exclusion zone of a defect of a glass sheet,
- the method being characterized in that it permits at least one of said cutting lines to pass through an exclusion zone of a defect of the other map.

In correlation, the invention relates to a system for generating a cutting plan of a complex glazing product comprising at least one glass sheet and at least one layer other than a glass sheet, this system comprising:
- a module for obtaining a map of the defects of the said at least one glass sheet;
- a module for obtaining at least one other defect map, the defects of said at least one other map not being defects of a glass sheet;
- each of these maps comprising, for each of its defects, a position of said defect, a size of said defect, and a criticality level of said defect;
- a module for generating a cutting plan of said complex glazing product at least using said maps and using a specification taking into account said criticality leve, said cutting plan comprising at least one cutting line and being such that none of said cutting lines passes through an exclusion zone of a said defect of said at least one glass sheet,
- said system being characterized in that said generating module permits at st one of said cutting lines to pass through an exclusion zone of a defect of said other map.

Thus, and generally, the method and system for generating a cutting plan according to the invention propose to relax certain cutting constraint by permitting cutting lines to pass through exclusion zones of defects other than those of the glass sheets.

The invention thus proposes to consider that certain defects, other than those of the glass sheets, may be non-critical with respect to positioning of the cutting lines. In one particular embodiment, the invention accepts that all the defect tallied in a map other than a glass-sheet map may be passed through by a cutting line, whatever their criticality level.

The layer other than a glass sheet may for example be a coating formed from one or more thin layers. Specifically, as known, it is conventional to equip a glass sheet with one or more coatings that provide it with particular properties, and especially particular optical properties (for example in respect of reflection or absorption of radiation in a given wavelength domain), particular properties in respect of electrical conduction, or even particular properties with respect to the ease of cleaning or to the ability of the substrate to self-clean. These coatings are generally stacks of thin layers based on inorganic compounds, in particular metals, oxides, nitrides or carbides. In the context of the invention, thin layer is understood to mean a layer the thickness of which is smaller than one micron and that generally varies between a few tens of nanometers and a few hundred nanometers (hence the qualificative "thin").

The method for generating a cutting plan according to the invention therefore permits cutting lines to pass through defects detected in such thin layers.

In one particular embodiment, the complex glazing product comprises at least two glass sheets and said at least one layer is an interlayer between the two said glass layers, for example one made of plastic, polyvinyl butyral (PVB) for example.

The method for generating a cutting plan according to the invention therefore permits cutting lines to pass through defects detected in such an interlayer.

In one particular embodiment, the defects of the other map are defect that appeared during the manufacture of said complex glazing product.

The method for generating a cutting plan according to the invention therefore permits cutting lines to pass through defects detected during assembly of the complex glazing product.

In one particular embodiment, the cutting plan is generated using a map of the complex glazing product, which map is obtained by combining said map of the defects of said at least one glass sheet and said other map.

In one particular embodiment, the method according to the invention comprises a step of storing the map of the complex glazing product in memory over a network, for example in a cloud.

In one embodiment, when the layer is an interlayer, for example one made of plastic, of PVB for example, the method comprises a step of cutting a roll to obtain this interlayer and the map of the defects of this interlayer is obtained using a map of the defects of the roll.

In one embodiment, the method comprises:
a step of reading a unique identifier of the roll; and
a step of downloading the map of the defects of the roll from a database indexed by this identifier.

In one embodiment, the method comprises:
a step of reading a unique identifier of said at least one glass sheet; and
a step of downloading said map of the defects of said at least one glass sheet from a database indexed by said identifier.

In one embodiment, the roll comprises locating means able to allow the length of an interlayer unrolled from the roll to be determined and the method comprises:
a step of reading the locating means with a view to unrolling the roll so as to cut the interlayer to a defined length;
the map of the defects of the interlayer being obtained using the map of the defects of said roll and using locating means.

Such locating means are known to those skilled in the art of velocimetry. They allow the length and unrolling rate or run speed of bands of material to be precisely determined. Optical velocimeters, for example laser surface vebcimeters, are in particular known.

In one embodiment, these locating means consist of an encoder wheel.

In one embodiment, the roll compris a marking along a falling edge of said roll, and the method comprises:
a step of reading this marking;
a step of aligning a coordinate system of the map of the defects of said at least one glass sheet and the map of the defects of the interlayer using this marking.

In one particular embodiment, the various steps of the method for generating a cutting plan according to the invention are defined by computer-program instructions.

Therefore, the invention also pertains to a computer program, on a data medium, this program containing instructions suitable for implementing the steps of a method for generating a cutting plan according to the invention.

This program may use any programming language, and take the form of source code, object code, or code intermediate between source code and object code, such as code in a partially compiled form, or in any other desirable form.

The invention also pertains to a storage medium that is readable by a computer, and containing instructions of a computer program such as mentioned above.

The data medium may be any entity or system capable of storing the program. For example, the medium may comprise a storage means, such as a ROM, for example a CD ROM or a ROM of a microelectronic circuit, or even a magnetic storage means, a hard disk for example.

Furthermore, the data medium may be a transmissible medium, such as an electrical or optical signal, that may be routed via an electrical or optical cable, via radio or via other means. The program according to the invention may in particular be downloaded over the Internet.

Alternatively, the data medium may be an integrated circuit into which the program is incorporated, the circuit being suitable for executing or for being used in the execution of the method in question.

BRIEF DESCRIPTION OF THE DRAWINGS

Other features and advantages of the present invention will become apparent from the description given below, with reference to the appended drawings that illustrate an exemplary embodiment thereof devoid of any limiting character. In the figures:

FIG. 1 shows a complex glazing product;
FIGS. 2A to 2D show maps able to be used in particular e bodiments of the invention;
FIG. 4 shows, in the form of a flowchart, the main steps of a method for generating a cutting plan according to one particular embodiment of the invention;
and
FIG. 5 shows a system for generating a cutting plan according to the invention.

DETAILED DESCRIPTION OF EMBODIMENTS OF THE INVENTION

Figure 3:
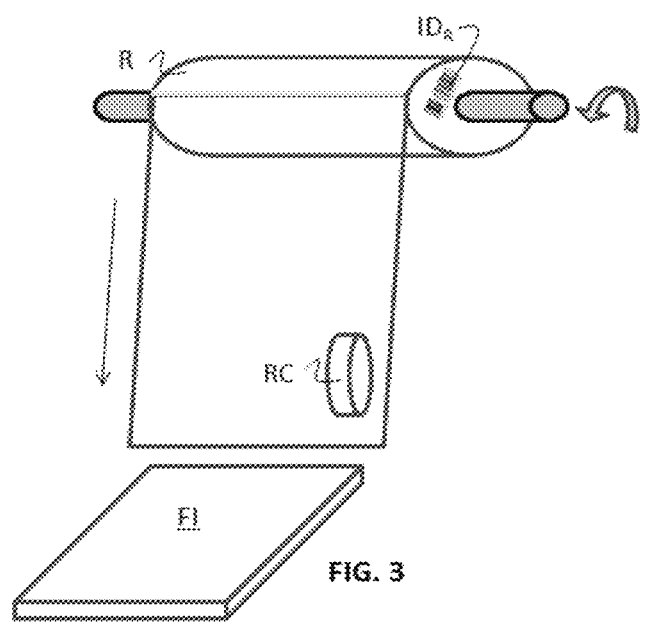
FIG. 3 shows a roll of the plastic PVB able to be used in one particular embodiment of the invention.

FIG. 1 shows a complex glazing product as meant in the context of the invention. In the example of FIG. 1 this complex glazing product is a laminated glass VF comprising two glass sheets FVi, FVj and an interlayer FI made of the plastic PVB.

Each glass sheet $FV_1$ comprises a unique identifier $ID_{FVi}$ marked on the glass sheet.

FIG. 2A shows an example of a map $C_{FV}$ of the defects of a glass sheet of identifier $ID_{FV}$. This map $C_{FV}$ comprises, for each of the defects of the glass sheet, a position POS of the defect in a coordinate system specific to this glass sheet, a size TAILLE of the defect, and a criticality level NC of said defect.

In the exemplary embodiment described here, these glass-sheet defect maps are stored in a database $BD_{CPV}$ indexed by the identifiers of the glass sheets.

FIG. 3 shows a roll R of the plastic PVB. This roll comprises a unique identifier $ID_R$ and an encoder wheel RC.

FIG. 2B shows an example of a map $C_R$ of the defects of the roll of identifier $ID_R$. This map $C_R$ comprises for each of the defects of the roll, a position POS of the defect in a coordinate system specific to this roll, a size TAILLE of the defect, and a criticality level NC of said defect.

In the exemplary embodiment described here, these roll defect maps are stored in a database $BD_R$ indexed by the identifiers of the rolls.

FIG. 4 shows, in the form of a flowchart, the main steps of a method for generating a cutting plan of a complex glazing product VF.

In this example, the method is described with respect to generation of a cutting plan optimized for the laminated glass VF of FIG. 1.

In the embodiment described here, this method comprises a step E10 of reading the unique identifier $ID_{FVi}$, $ID_{FVj}$ of each of the two glass sheets FVi, FVj and a step E20 of downloading maps $C_{PVi}$, $C_{FVj}$ of the defects of each of these glass sheets from the database $BD_{CPV}$ using their identifiers.

In the embodiment described here, the method according to the invention comprises a step E30 of reading the unique identifier $ID_R$ of the roll R and a step E40 of downloading the map CF of the defects of the roll from the database $BD_{CR}$.

In the embodiment described here, to cut (step E60) an interlayer made of the plastic PVB to a size substantially equal to that of the glass sheets $FV_i$, $FV_j$, the roll R is unrolled, this having the effect of driving the encoder wheel RC.

In the embodiment described here, a map $C_{FI}$ of the defects of the interlayer is obtained in a step E70 using the map $C_R$ of the defects of the roll and information read from the encoder wheel RC (step E50).

The glass sheets and the interlayer are assembled in a step E75 to form the laminated glass VF.

At the end of this assembling step, the laminated glass is analyzed and, optionally, a map $C_{DF}$ of the defects that appeared during the manufacture is created in a step E80.

This map $C_{DF}$ comprises, for each of the defects that appeared during the assembly, a position of the defect in a coordinate system specific to the laminated glass VF, a size of the defect, and a criticality level of said defect. An example of such a map is given in FIG. 2C. This map $C_{DF}$ comprises, for each of the defects that appeared during the assembly, a position POS of the defect in a coordinate system specific to this glass sheet, a size TAILLE of the defect, and a criticality level NC of said defect.

In the embodiment described here, the method according to the invention comprises a step E90 of generating a map $C_{VF}$ of the laminated glass VF by combining the map $C_{PVi}$, $C_{FVj}$ of the defects of each of the glass sheets, the map $C_{FI}$ of the defects of the PVB interlayer and the map $C_R$ of the defects that appeared during the assembly. As known, this step requires an operation of aligning the coordinate systems associated with each of the maps.

In the embodiment described here, the method according to the invention comprises a step E100 of storing the map $C_{VF}$ of the complex glazing product (here of the laminated glass VF) in memory in a database $BF_{VF}$ over the network.

An example of such a map is shown in FIG. 2D. This map $C_{VF}$ comprises, for each of the defects of the glazing product, a position POS of the defect in a coordinate system specific to this glazing product, a size TAILLE of the defect, and a criticality level NC of said defect. It is noteworthy in that it furthermore comprises, for each defect, an attribute ATT indicating whether the defect is a defect of a glass sheet, a defect of the PVB interlayer or a defect that appeared during the assembly.

In the embodiment described here, the method according to the invention comprises a step E110 of generating a cutting plan PDD of the complex glazing product VF using the map $C_{VF}$ of the complex glazing product and using a specification CDC.

This specification takes into account the criticality levels of each of the defects in order to cut the pieces of laminated glass so as to minimize losses due to poor quality.

According to the invention, no cutting line of this cutting plan passes through an exclusion zone of a defect of the sheet of a glass sheet. In the embodiment described here, these exclusion zones are circles of 1 cm radius around the defects.

The method according to the invention is noteworthy in that it permits at least one cutting line of the cutting plan to pass through an exclusion zone of a defect of the PVB interlayer or through an exclusion zone of a defect that appeared during assembly.

FIG. 5 shows a system SGPD for generating a cutting plan according to the invention. This system comprises a computer ORD comprising a processor 10, a random-access memory 11, a read-only memory 12, and a communication module COM for communicating over an network NET.

The read-only memory 12 is a medium according to the invention. It stores a computer program PG according to the invention, the instructions of which, when they are executed by the processor 10, implement the steps of the method for generating the cutting plan that were described above with reference to FIG. 4.

This computer is connected to scanners SC configured in read the identifiers of the glass sheets and of the roll. It is also connected to a camera CAM for detecting any defects that appeared during the manufacture of the complex glazing product.

The communication module COM allows this computer to download the various defect maps from the databases BDVF (map of the defects of the glass sheets) and BDP (map of the defects of the roll).

This communication module COM also allows the map $C_{VF}$ of the complex glazing product to be stored in memory in the database $BD_{VF}$.

The invention claimed is:

1. A method for generating a cutting plan of a complex glazing product comprising at least one glass sheet and at least one layer other than a glass sheet, the method comprising:
    obtaining a map of the defects of said at least one glass sheet;
    obtaining at least one other defect map, the defects of said at least one other map not being defects of a glass sheet;
    each of said maps and other defect map comprising, for each of its defects, a position of said defect, a size of said defect, and a criticality level of said defect;
    generating a cutting plan of said complex glazing product at least using said map and other defect maps and using a specification taking into account said criticality levels, said cutting plan comprising at least one cutting line and being such that none of said cutting lines passes through an exclusion zone of a said defect of said at least one glass sheet,
wherein at least one of said cutting lines passes through an exclusion zone of a defect of said other map.

2. The method as claimed in claim 1, wherein the defects of said at least one other map are:
defects of said at least one layer; or
defects that appeared during the manufacture of said complex glazing product.

3. The method as claimed in claim 1, wherein said cutting plan is generated using a map of said complex glazing product, which map is obtained by combining said map of the defects of said at least one glass sheet and said other map, said map comprising, for each defect, an attribute indicating whether the defect is a defect of a glass sheet, a defect of said at least one layer or a defect that appeared during assembly.

4. The method as claimed in claim 3, further comprising storing said map of said complex glazing product in memory over a network.

5. The method as claimed in claim 1, wherein said at least one layer is a thin layer.

6. The method as claimed in claim 1, wherein said complex glazing product comprises at least two glass sheets and wherein said at least one layer is an interlayer between the two glass sheets.

7. The method as claimed in claim 6, further comprising:
cutting a roll to obtain said interlayer;
said map of the defects of said interlayer being obtained using a map of the defects of said roll.

8. The method as claimed in claim 7, further comprising:
reading a unique identifier of said roll; and
downloading said map of the defects of the roll from a database indexed by said identifier.

9. The method as claimed in claim 1, wherein:
reading a unique identifier of said at least one glass sheet; and
downloading said map of the defects of said at least one glass sheet from a database indexed by said identifier.

10. The method as claimed in claim 7, wherein said roll comprises locating means able to allow the length of an interlayer unrolled from said roll to be determined and the method comprises:
reading said locating means with a view to unrolling the roll so as to cut said interlayer to a defined length;
said map of the defects of said interlayer being obtained using the map of the defects of said roll and using said locating means.

11. The method as claimed in claim 7, wherein said roll comprises a marking along a falling edge of said roll, and the method comprises:
reading said marking;
aligning a coordinate system of said map of the defects of said at least one glass sheet and said map of the defects of said at least one layer using said marking.

12. A system for generating a cutting plan of a complex glazing product comprising at least one glass sheet and at least one layer other than a glass sheet, the system comprising:
a module for obtaining a map of the defects of said at least one glass sheet;
a module for obtaining at least one other defect map, the defects of said at least one other map not being defects of a glass sheet;
each of said maps comprising, for each of its defects of said map, a position of said defect, a size of said defect, and a criticality level of said defect;
a module for generating a cutting plan of said complex glazing product at least using said map and said at least one other defect map and using a specification taking into account said criticality levels, said cutting plan comprising at least one cutting line and being such that none of said cutting lines passes through an exclusion zone of a said defect of said at least one glass sheet,
wherein said generating module permits at least one of said cutting lines to pass through an exclusion zone of a defect of said other map.

13. A computer program containing instructions for executing the steps of the method for generating a cutting plan as claimed in claim 1 when said program is executed by a computer.

14. A non-transitory storage medium that is readable by a computer, on which is stored a computer program containing instructions for executing the steps of the method for generating a cutting plan as claimed in claim 1.

15. The method as claimed in claim 6, wherein said interlayer is made of plastic.

16. The method as claimed in claim 15, wherein said plastic is polyvinyl butyral.

* * * * *